C. A. BRADLEY.
Steam-Washers.
No. 137,591. Patented April 8, 1873.
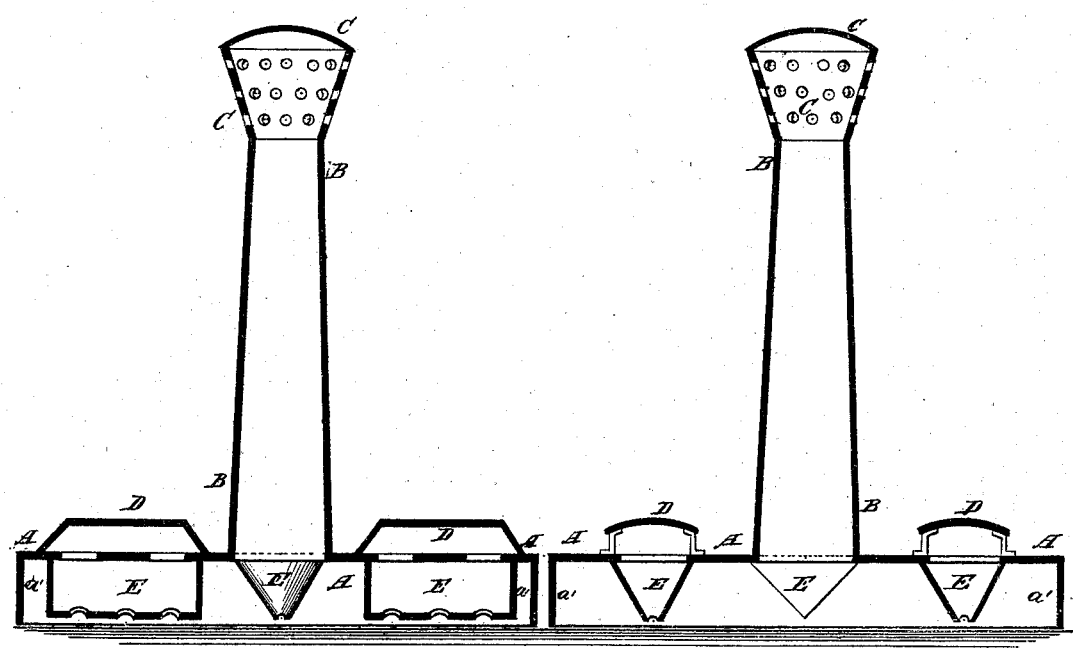

UNITED STATES PATENT OFFICE.

CHARLES A. BRADLEY, OF MONTICELLO, FLORIDA.

IMPROVEMENT IN STEAM-WASHERS.

Specification forming part of Letters Patent No. 137,591, dated April 8, 1873; application filed December 21, 1872.

*To all whom it may concern:*

Be it known that I, CHARLES A. BRADLEY, of Monticello, in the county of Jefferson and State of Florida, have invented a new and useful Improvement in Steam-Washer, of which the following is a specification:

Figure 1 is a detail vertical section of my improved washer taken through the line $x\ x$, Fig. 3. Fig. 2 is a detail vertical section of the same taken through the line $y\ y$, Fig. 3. Fig. 3 is a top view of the same.

Similar letters of reference indicate corresponding parts.

My invention has for its object to improve the construction of steam-washers in such a way that the steam and water can only escape through the discharge-tube, and cannot escape through the return or ingress openings. The invention consists in the combination of downwardly-projecting tubes, made V-shaped in their cross-section, with the ingress-openings in the plate of a steam-washer, as hereinafter more fully described.

A represents a plate, which may be round, oval, square, or of any other desired form, and which is made with a downwardly-projecting flange, $a'$, around its edge, as shown in Figs. 1 and 2. In the center of the plate A is formed the egress or discharge opening, in which is secured the lower end of the discharge-tube B. To the upper end of the tube B is secured a cap, C, which is made in the form of an inverted frustum of a cone. The cap C is made with a close convex top, and in its sides are formed numerous small holes, as shown in Figs. 1 and 2, through which the steam and water are scattered or sprinkled over all parts of the clothes. In the flanged plate A $a'$ are formed one or more openings, through which the water passes back into the space beneath the said plate A, and which are covered with caps or guards D to prevent the said openings from becoming choked or clogged by the clothes being operated upon, said guards having openings at their sides to allow the water to pass freely into the openings beneath them. To the under side of the plate A, around the ingress-holes, are secured tubes or funnels E, which may be made conical or with inclined sides so as to be V-shaped in their cross-section. The tubes E have holes in their lower ends, and extend to, or nearly to, the lower edge of the flange $a'$ so as to be always submerged, and thus prevent the possibility of the steam or water being forced out through said ingress-openings, and insuring its passage through the discharge-tube B.

Having thus described my invention, I claim as new and desire to secure by Letters Patent—

The combination of downwardly-projecting tubes E, made V-shaped in their cross-section, with the ingress-opening in the plate A of a steam-washer, substantially as herein shown and described, and for the purpose set forth.

CHARLES A. BRADLEY.

Witnesses:
J. B. COLLINS,
JAMES C. SMYTHE.